(12) United States Patent
Sato et al.

(10) Patent No.: US 7,463,347 B2
(45) Date of Patent: Dec. 9, 2008

(54) SIMULATOR OF OPTICAL INTENSITY DISTRIBUTION, COMPUTER IMPLEMENTED METHOD FOR SIMULATING THE OPTICAL INTENSITY DISTRIBUTION, METHOD FOR COLLECTING MASK PATTERN, AND COMPUTER PROGRAM PRODUCT FOR THE SIMULATOR

(75) Inventors: Takashi Sato, Kanagawa (JP); Ayako Nakano, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

(21) Appl. No.: 11/389,125

(22) Filed: Mar. 27, 2006

(65) Prior Publication Data

US 2006/0256315 A1   Nov. 16, 2006

(30) Foreign Application Priority Data

Mar. 28, 2005   (JP) ............................ P2005-092669

(51) Int. Cl.
*G01B 9/00* (2006.01)
*G03B 27/62* (2006.01)
*G03B 27/42* (2006.01)

(52) U.S. Cl. .................... 356/121; 356/124; 355/53; 355/73

(58) Field of Classification Search ......... 356/121–127, 356/603–606, 621–622; 382/144–145; 430/311; 53/53, 75
See application file for complete search history.

(56) References Cited

U.S. PATENT DOCUMENTS

| 5,644,390 | A | | 7/1997 | Yasuzato |
| 5,876,883 | A | | 3/1999 | Leroux |
| 6,137,901 | A | * | 10/2000 | Harazaki ..................... 382/144 |
| 6,982,786 | B2 | * | 1/2006 | Shiode ...................... 356/121 |
| 7,002,665 | B2 | * | 2/2006 | Sato et al. ..................... 355/53 |
| 2004/0227921 | A1 | | 11/2004 | Sato et al. |

FOREIGN PATENT DOCUMENTS

JP   9-43828   2/1997

* cited by examiner

*Primary Examiner*—Sang Nguyen
(74) *Attorney, Agent, or Firm*—Finnegan, Henderson, Farabow, Garrett & Dunner, L.L.P.

(57) ABSTRACT

A simulator of an optical intensity distribution includes a field divider dividing an exposure field on a substrate into a first and second fields, the first field being to be directly exposed to a light incident at the maximum incident angle, the second field being prevented from being directly exposed to the light by a protrusion on the substrate, a first optical intensity calculator calculating an optical intensity of the first field by using a direct incident light component of the light, a second optical intensity calculator calculating an optical intensity of the second field by using a reflected light component of the light reflected from a sidewall of the protrusion, and a projected image simulation engine simulating an optical intensity distribution of a projected image of a mask pattern on the substrate, based on the optical intensities of the first field and the second field.

20 Claims, 13 Drawing Sheets

SIMULATOR OF OPTICAL INTENSITY DISTRIBUTION, COMPUTER IMPLEMENTED METHOD FOR SIMULATING THE OPTICAL INTENSITY DISTRIBUTION, METHOD FOR COLLECTING MASK PATTERN, AND COMPUTER PROGRAM PRODUCT FOR THE SIMULATOR

CROSS REFERENCE TO RELATED APPLICATIONS AND INCORPORATION BY REFERENCE

This application is based upon and claims the benefit of priority from prior Japanese Patent Application P2005-092669 filed on Mar. 26, 2005; the entire contents of which are incorporated by reference herein.

BACKGROUND OF THE INVENTION

1. Field of the Invention

The present invention relates to photolithographic projection and in particular to a simulator of an optical intensity distribution, a computer implemented method for simulating the optical intensity distribution, a method for correcting a mask pattern, and a computer program product for the simulator.

2. Description of the Related Art

When a semiconductor device is manufactured by using lithography process, a light component incident on a surface of a substrate is blocked by a protrusion on the substrate. In this case, calculating an optical intensity distribution around the protrusion by using Maxwell equation requires a great investment of time. Therefore, such calculation lacks in practically. In an earlier method, it is assumed that the all components of the light enter the surface perpendicularly and the all components are reflected from the surface perpendicularly to simplify the calculation. However, the result of the earlier method deviates from an actual result of the optical intensity distribution. Japanese Patent Laid-Open Publication No. Hei 9-43828 describes a method for incorporating an effect of the protrusion on a rate of dissolution into a development simulation easily. However, in a simulation for simulating the optical intensity distribution, a method for simulating the optical intensity distribution precisely at high speed when the protrusion is disposed on the substrate has not been proposed.

SUMMARY OF THE INVENTION

An aspect of present invention inheres in a simulator of an optical intensity distribution according to an embodiment of the present invention. The simulator includes a field divider configured to divide an exposure field on a substrate into a first field and a second field. The first field is to be directly exposed to a light incident at the maximum incident angle. The maximum incident angle is determined by a numerical aperture of an optical projection system. The second field is prevented from being directly exposed to the light by a protrusion disposed on the substrate. The simulator further includes a first optical intensity calculator configured to calculate an optical intensity of the first field by using a direct incident light component of the light, a second optical intensity calculator configured to calculate an optical intensity of the second field by using a reflected light component of the light reflected from a sidewall of the protrusion, and a projected image simulation engine configured to simulate an optical intensity distribution of a projected image of a mask pattern on the substrate, based on the optical intensities of the first field and the second field.

Another aspect of the present invention inheres in a computer implemented method for simulating the optical intensity distribution according to the embodiment of the present invention. The computer implemented method includes dividing the exposure field on the substrate into the first field and the second field. The first field is to be directly exposed to the light incident at the maximum incident angle. The maximum incident angle is determined by the numerical aperture of the optical projection system. The second field is prevented from being directly exposed to the light by the protrusion disposed on the substrate. The computer implemented method further includes calculating the optical intensity of the first field by using the direct incident light component of the light, calculating the optical intensity of the second field by using the reflected light component of the light reflected from the sidewall of the protrusion, and simulating the optical intensity distribution of the projected image of the mask pattern on the substrate, based on the optical intensities of the first field and the second field.

Yet another aspect of the present invention inheres in a method for correcting the mask pattern according to the embodiment of the present invention. The method for correcting the mask pattern includes dividing the exposure field on the substrate into the first field and the second field, the first field being to be directly exposed to the light incident at the maximum incident angle, the maximum incident angle being determined by the numerical aperture of an optical projection system, the second field being prevented from being directly exposed to the light by the protrusion disposed on the substrate, calculating the optical intensity of the first field by using the direct incident light component of the light, calculating the optical intensity of the second field by using the reflected light component of the light reflected from the sidewall of the protrusion, simulating the optical intensity distribution of the projected image of the mask pattern on the substrate, based on the optical intensities of the first field and the second field, calculating the difference between the projected image and the design pattern of the circuit pattern manufactured by using the mask pattern, and correcting design data of the mask pattern to reduce the difference.

Yet another aspect of the present invention inheres in a computer program product for the simulator according to the embodiment of the present invention. The computer program product includes instructions configured to divide the exposure field on the substrate into the first field and the second field, the first field being to be directly exposed to the light incident at the maximum incident angle, the maximum incident angle being determined by the numerical aperture of the optical projection system, the second field being prevented from being directly exposed to the light by the protrusion disposed on the substrate, instructions configured to calculate the optical intensity of the first field by using the direct incident light component of the light, instructions configured to calculate the optical intensity of the second field by using the reflected light component of the light reflected from the sidewall of the protrusion, and instructions configured to simulate the optical intensity distribution of the projected image of the mask pattern on the substrate, based on the optical intensities of the first field and the second field.

DETAILED DESCRIPTION OF THE INVENTION

Figure 1:
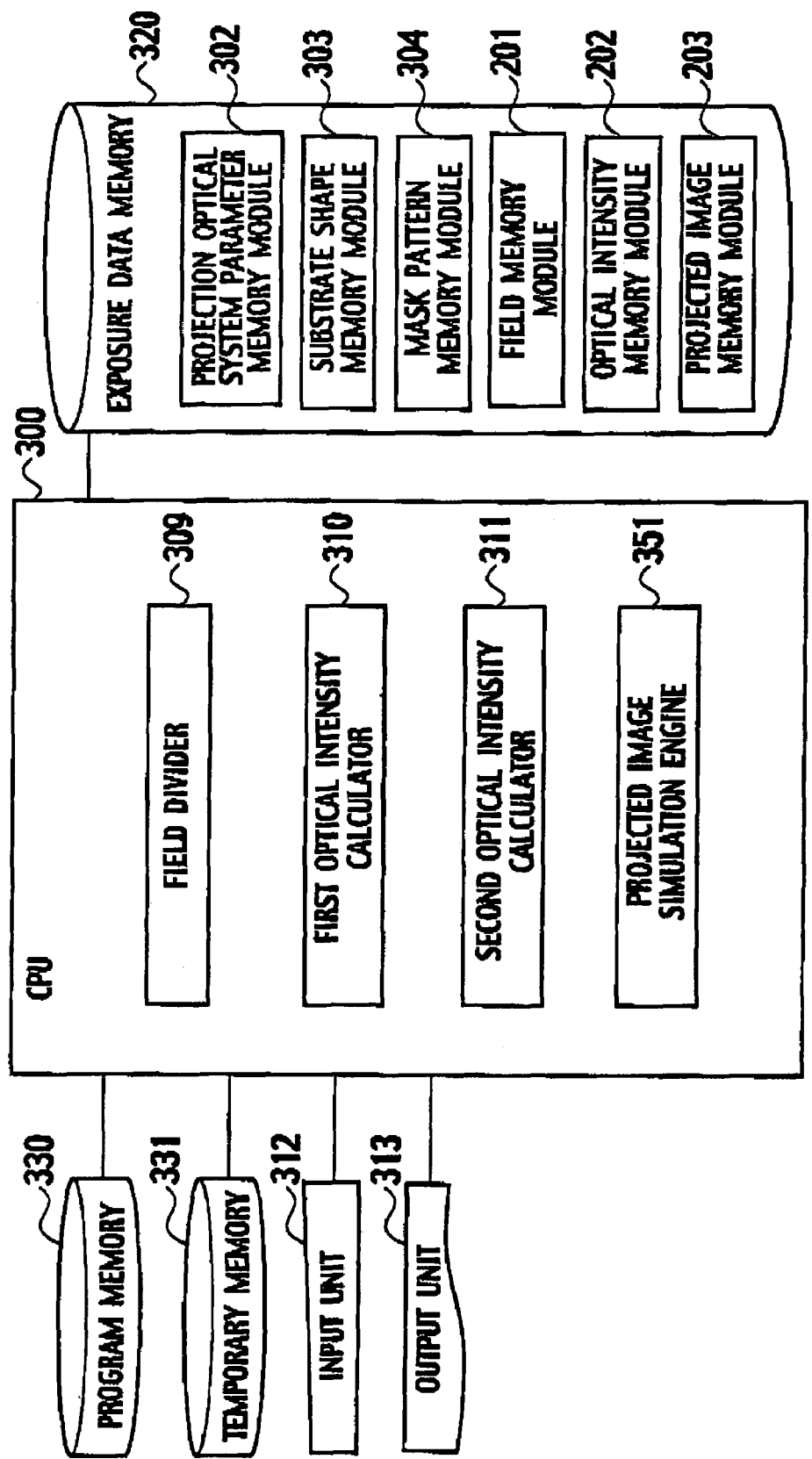
FIG. 1 is a diagram of a simulator of an optical intensity distribution in accordance with a first embodiment of the present invention.

Embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIRST EMBODIMENT

With reference to FIG. 1, a simulator of an optical intensity distribution according to the first embodiment of the present invention includes a central processing unit (CPU) 300. The CPU 300 includes a field divider 309, a first optical intensity calculator 310, a second optical intensity calculator 311, and a projected image simulation engine 351. The field divider 309 is configured to divide an exposure field on a substrate into a first field and a second field. The first field is to be directly exposed to a light incident at the maximum incident angle. The maximum incident angle is determined by a numerical aperture of an optical projection system. The second field is prevented from being directly exposed to the light incident at the maximum incident angle by a protrusion on the substrate.

The first optical intensity calculator 310 is configured to calculate an optical intensity of the first field by using a direct incident light component of the light. The second optical intensity calculator 311 is configured to calculate an optical intensity of the second field by using a reflected light component of the light reflected from a sidewall of the protrusion. The projected image simulation engine 351 is configured to simulate an optical intensity distribution of a projected image of a mask pattern on the substrate, based on the optical intensities of the first field and the second field.

Figure 2:
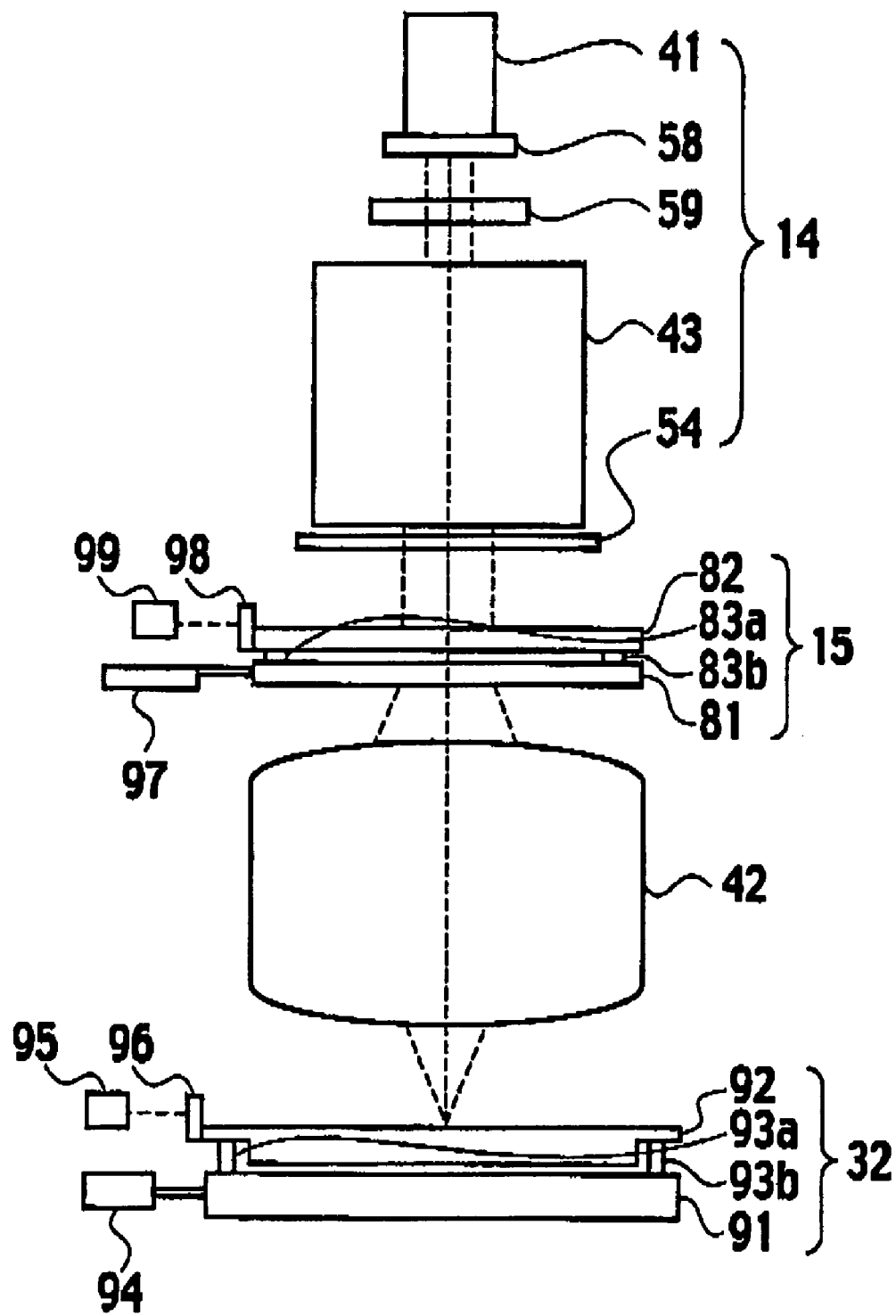
FIG. 2 illustrates an exposure tool in accordance with the first embodiment of the present invention.

FIG. 2 shows an example of an exposure tool simulated by the simulator of the optical intensity distribution shown in FIG. 1. The exposure tool includes an illumination optical system 14. The illumination optical system 14 includes a light source 41 for emitting the light, an aperture diaphragm holder 58 disposed under the light source 41, a polarizer 59 for polarizing the light emitted from the light source 41, an illuminator 43 for condensing the light, and a slit holder 54 disposed under the illuminator 43. The exposure tool 3 further includes a reticle stage 15 disposed beneath the slit holder 54, a projection optical system 42 disposed beneath the reticle stage 15, and a wafer stage 32 disposed beneath the projection optical system 42.

The reticle stage 15 includes a reticle XY stage 81, shafts 83a, 83b provided on the reticle XY stage 81, and a reticle tilting stage 82 attached to the reticle XY stage 81 through the shafts 83a, 83b. The reticle stage 15 is attached to a reticle stage aligner 97. The reticle stage aligner 97 aligns the position of the reticle XY stage 81. Each of the shafts 83a, 83b extends from the reticle XY stage 81. Therefore, the position of the reticle tilting stage 82 is determined by the reticle XY stage 81. The tilt angle of the reticle tilting stage 82 is determined by the shafts 83a, 83b. Further, a reticle stage mirror 98 is attached to the edge of the reticle tilting stage 82. The position of the reticle tilting stage 82 is monitored by an interferometer 99 disposed opposite the reticle stage mirror 98.

The wafer stage 32 includes a wafer XY stage 91, shafts 93a, 93b provided on the wafer XY stage 91, and a wafer tilting stage 92 attached to the wafer XY stage 91 through the shafts 93a, 93b. The wafer stage 32 is attached to a wafer stage aligner 94. The wafer stage aligner 94 aligns the position of the wafer XY stage 91. Each of the shafts 93a, 93b extends from the wafer XY stage 91. Therefore, the position of the wafer tilting stage 92 is determined by the wafer XY stage 91. The tilt angle of the wafer tilting stage 92 is determined by the shafts 93a, 93b. Further, a wafer stage mirror 96 is attached to the edge of the wafer tilting stage 92. The position of the wafer tilting stage 92 is monitored by an interferometer 95 disposed opposite the wafer stage mirror 96.

An image of an entrance pupil of the projection optical system 42 is originally seen as a circle of which radius is equal to the numerical aperture "$NA_p$" of the projection optical system 42 from an image space on the substrate disposed on the wafer stage 32. However, when the protrusion is disposed on the substrate, the image of the entrance pupil of the projection optical system 42 is seen as the circle on the wane from the image space where the light cannot enter at the maximum incident angle by the protrusion. Such chipped portion of the entrance pupil is hereinafter referred to as a "missing portion".

Figure 3:
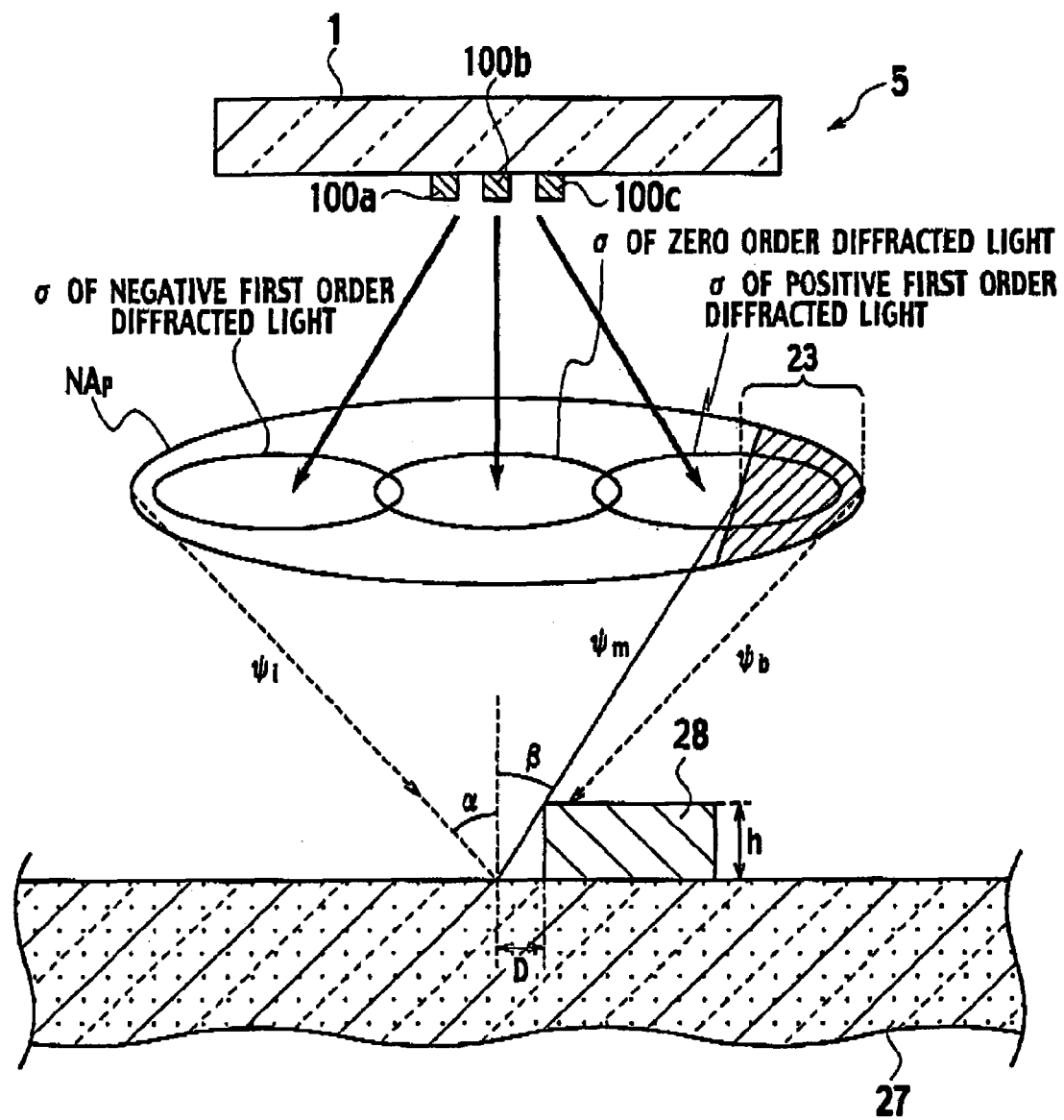
FIG. 3 illustrates an optical system of the exposure tool in accordance with the first embodiment of the present invention.
Figure 4:
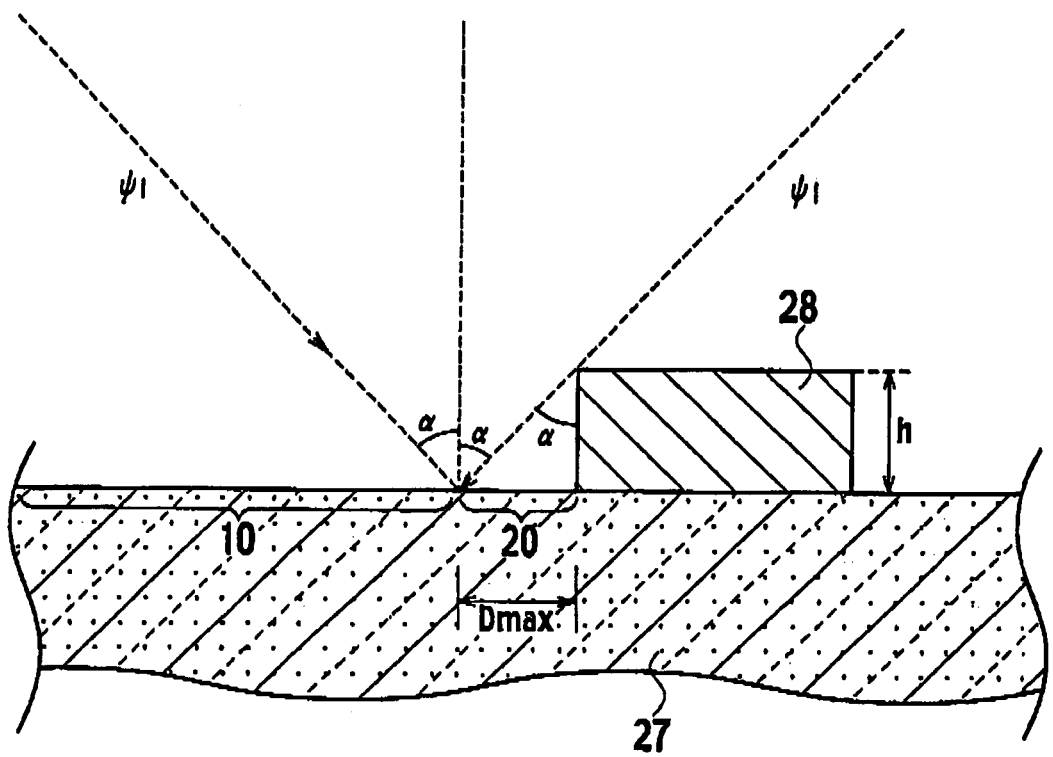
FIG. 4 is a first diagram of an optical path of a light incident on a surface of a substrate in accordance with the first embodiment of the present invention.
Figure 5:
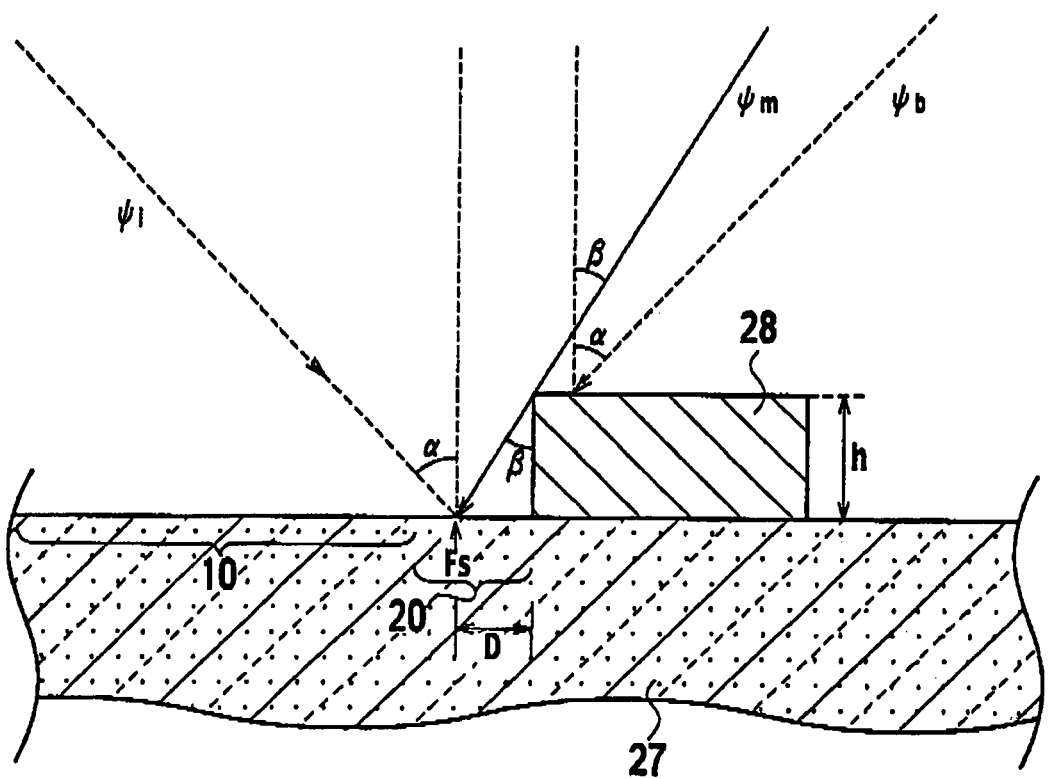
FIG. 5 is a second diagram of the optical path of the light incident on the surface of the substrate in accordance with the first embodiment of the present invention.

FIG. 3 illustrates a photomask 5 disposed on the reticle stage 15 of the exposure tool, shown in FIG. 2, the numerical aperture "$NA_p$" of the projection optical system 42, and the substrate 27 disposed on the wafer stage 32. A silicon wafer can be used as the substrate 27, for example. The photomask 5, shown in FIG. 3, includes a transparent substrate 1 and a plurality of light shield patterns 100a, 100b, 100c disposed on a back side of the transparent substrate 1. A rectangular parallelepiped protrusion 28 composed of poly silicon is disposed on a surface of the substrate 27. The protrusion 28 has a height "h". Here, lengthwise directions of the plurality of light shield patterns 100a, 100b, 100c and a lengthwise direction of the protrusion 28 are parallel. The light "$\phi_i$" is emitted from the light source 41, shown in FIG. 2, and passes through the photomask 5, shown in FIG. 3. The maximum incident angle "$\alpha$" of the light "$\phi_i$" on the surface of the substrate 27 is a half of an angular aperture "$2\alpha$" determined by the numerical aperture "$NA_p$". In this case, a portion of the surface of the substrate 27, shown in FIG. 4, is shaded since the light component "$\phi_b$" of the incident light "$\phi_i$" is blocked by protrusion 28, as shown in FIG. 5. Such shaded field extends for a distance "$D_{max}$" from the edge of the protrusion 28 as shown in FIG. 4. The distance "$D_{max}$" is given by equation (1).

$$D_{max} = h * \tan \alpha \qquad (1)$$

With reference to FIG. 5, an objective image point "Fs" on the substrate 27 is a distance "D" away from the protrusion 28. The distance "D" is shorter than the distance "$D_{max}$". Therefore, the objective image point "Fs" is shaded. Accordingly, with reference to FIG. 6, an image of an aperture 127 of the projection optical system 42 seen from the objective image point "Fs" has the missing portion 23. Consequently, an exit pupil 25 is not circular.

On the other hand, a field more than the distance "$D_{max}$" away from the edge of the protrusion 28 on the substrate 27 is directly exposed to the direct incident light component "$\phi_i$", since the protrusion 28 does not block the direct incident light component "$\phi_i$". Therefore, an exit pupil seen from an image point on the field not shaded by the protrusion 28 does not have the missing portion.

The field divider 309, shown in FIG. 1, analyzes CAD data of a surface topology of the substrate 27 exposed to the light, for example. Further, the field divider 309 divides the surface of the substrate, shown in FIG. 4, into the first field 10 and the second field 20 by using the equation (1). The "first field 10" is directly exposed to the direct incident light component "$\phi_i$" incident at the maximum incident angle "$\alpha$". The "first field 10" is not shaded by the protrusion 28. The "second field 20" is not directly exposed to the direct incident light component "$\phi_i$" incident at the maximum incident "$\alpha$". The "second field 20" is shaded by the protrusion 28.

The first optical intensity calculator 310, shown in FIG. 1, calculates the optical intensity of the "first field 10" shown in FIG. 4. The following is an explanation of a method for calculating the optical intensity by first optical intensity calculator 310. A wavefront aberration is expressed as W($\xi$, $\eta$) by using the coordinates ($\xi$, $\eta$) on the exit pupil of the projection optical system 42 shown in FIG. 2. In this case, a pupil function P($\xi$, $\eta$) of the projection optical system 42 is given by equation (2).

$$P(\xi, \eta) = P_0(\xi, \eta)\exp(i*k*W(\xi, \eta)) \qquad (2)$$

Here, $P_0(\xi, \eta)$ is a function of the aperture. $P_0(\xi, \eta)$ is one on the inside of the pupil. $P_0(\xi, \eta)$ is zero on the outside of the pupil. "k" is a wave number of the light. "k" is given by equation (3).

$$k = 2\pi/\lambda \qquad (3)$$

Here, "$\lambda$" is a wavelength of the light. When a projected image of the mask pattern on the photomask 5, shown in FIG. 3, is formed by the projection optical system 42 shown in FIG. 2, an optical intensity I(x, y) of the projected image is given by equation (4).

$$I(x, y) = \int_{-\infty}^{\infty} \int \int \int T(f_1, f_2; g_1, g_2) a^*(f_2, g_2) \exp \qquad (4)$$
$$[i(f_1 - f_2)x + i(g_1 - g_2)y] df_1 df_2 dg_1 dg_2$$

Here, "a" is a fourier spectrum of the mask pattern. "a*" is a complex conjugate of "a". $T(f_1, f_2; g_1, g_2)$ is a transmission cross coefficient (TCC) function. The TCC function shows a frequency response of the projection optical system 42. The TCC function is given by equation (5).

$$T(\xi_1, \xi_2; \eta_1, \eta_2) = \int_{-\infty}^{\infty} \int S(\xi, \eta) P(\xi - \xi_1, \eta - \eta_1) \times \qquad (5)$$
$$P^*(\xi - \xi_2, \eta - \eta_2) d\xi d\eta$$

Here, S($\xi$, $\eta$) is a function showing an effective light source on the pupil. When a distribution of a luminance of the effective light source is even, S($\xi$, $\eta$) is one on the inside of a circle having a radius "$\sigma$" and is zero on the outside of the circle. The partial coherence ratio (coherency) "$\sigma$" is a ratio of a numerical aperture "$NA_i$" of the illumination optical system 14 to the numerical aperture "$NA_p$" of the projection optical system 42. The first optical intensity calculator 310, show in FIG. 1, calculates the optical intensity $I_1(x, y)$ of the "first field 10", shown in FIG. 4, by using the equations (2)-(5).

The second optical intensity calculator 311, shown in FIG. 1, calculates the optical intensity $I_2(x, y)$ of the "second field 20", shown in FIG. 4. With reference to FIG. 5, an angle between a line passing through a point on an upper side of the sidewall of the protrusion 28 and the objective image point "Fs" and the sidewall of the protrusion 28 is "$\beta$". In this case, a light component "$\phi_m$" entered at an incident angle that is smaller than "$\beta$" from a side where the protrusion 28 is disposed reaches the objective image point "Fs" on the "second field 20". However, a light component "$\phi_b$" at an incident angle that is more than "$\beta$" and less than "$\alpha$" cannot reach the objective image point "Fs", since the light component "$\phi_b$" is blocked by the protrusion 28.

Figure 6:
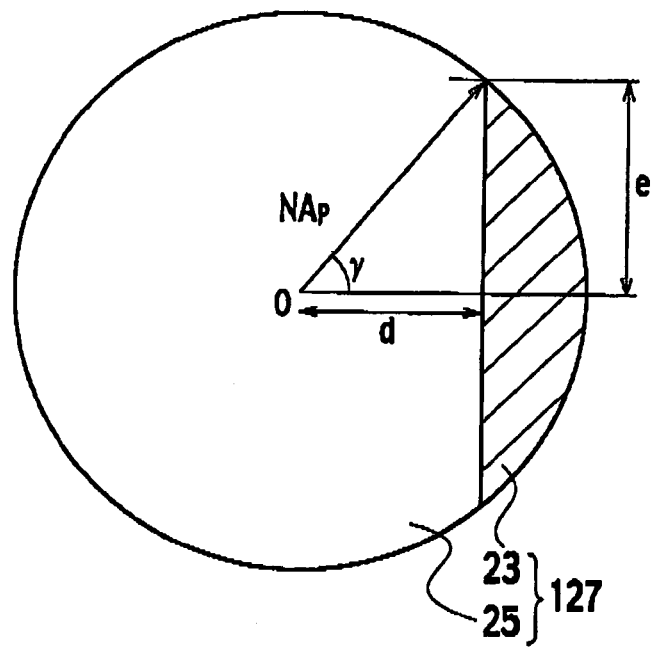
FIG. 6 is a first diagram of an exit pupil in accordance with the first embodiment of the present invention.

When it is assumed that a reflected light reflected from the sidewall of the protrusion 28 is negligible, the image of the aperture 127 of the projection optical system 42 seen from the objective image point "Fs" has the missing portion 23, as shown in FIG. 6. Therefore, the shape of the exit pupil 25 is not circular. However, when the reflected light reflected from the sidewall of the protrusion 28 is took into account, a light component "$\phi_r$" incident on the sidewall of the protrusion 28, shown in FIG. 7, from the opposite side of the protrusion 28 at the incident angle that is more than "$\beta$" and less than "$\alpha$" is reflected from a point a distance "R" away from the upper side of the sidewall of the protrusion 28 and reaches the objective image point "Fs". The distance "R" is given by equation (6)

$$R = h - D/\tan \alpha \qquad (6)$$

Figure 7:
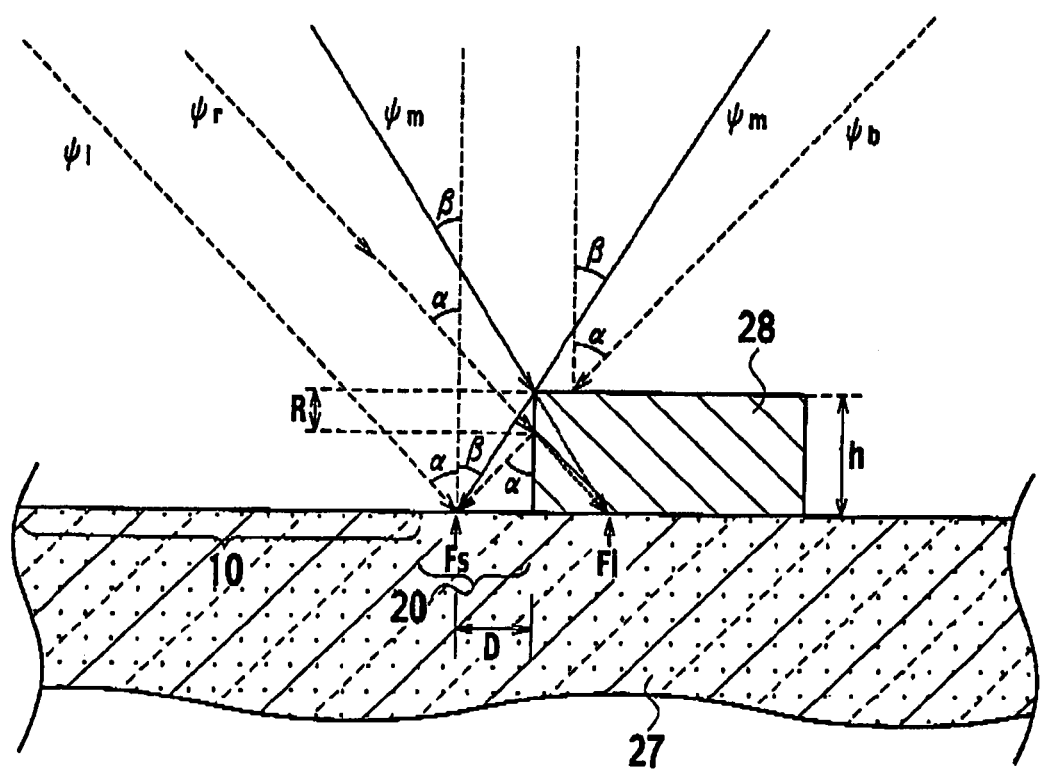
FIG. 7 is a third diagram of the optical path of the light incident on the surface of the substrate in accordance with the first embodiment of the present invention.

When it is assumed that the protrusion 28 does not exist on the substrate 27, the light component "$\phi_r$" reaches a hypothetical image point "Fi", shown in FIG. 7. The hypothetical image point "Fi" and the objective image point "Fs" are symmetric with respect to the sidewall of the protrusion 28. In this case, the light component "$\phi_r$" comes from a contribution portion 223 of the exit pupil 127, shown in FIG. 8, and reaches the hypothetical image point "Fi". The missing portion 23 and the contribution portion 223 correspond to the light components incident on the surface of the substrate 27 at the incident angle that is more than "β" and less than "α". Therefore, the missing portion 23 and the contribution portion 223 are congruent. The light component "$\phi_b$" passing through the missing portion 23 of the aperture 127 of the projection optical system 42 does-not contribute to image formation at the objective image point "Fs". However, the light component "$\phi_r$" passing through the contribution portion 223 symmetrical to the missing portion 23 contributes to the image formation at the objective image point "Fs". Therefore, the contribution portion 223, shown in FIG. 8, is seen on the place of the missing portion 23 from the objective image point "Fs" shown in FIG. 7.

Figure 8:
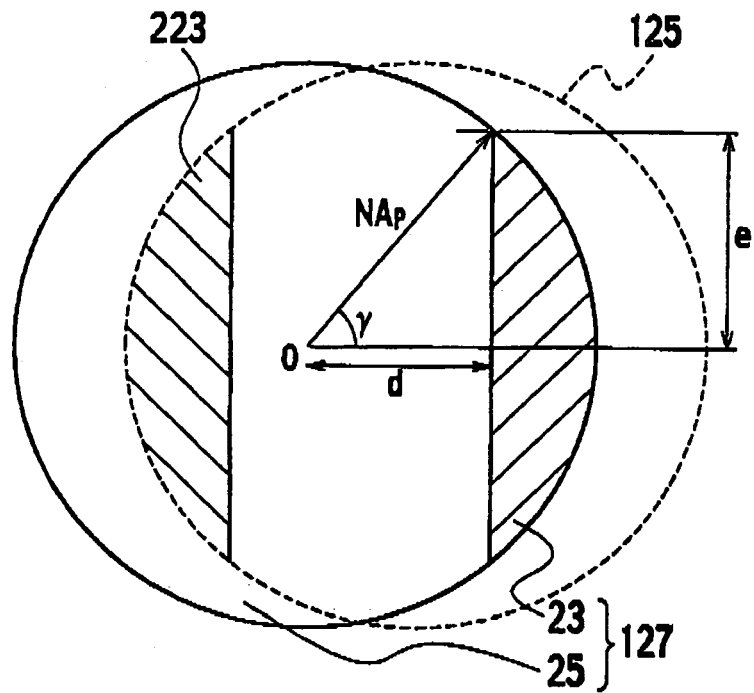
FIG. 8 is a second diagram of the exit pupil in accordance with the first embodiment of the present invention.

The second optical intensity calculator 311, shown in FIG. 1, calculates the optical intensity $I_2(x, y)$ of the "second field 20", based on an area of the missing portion 23 shown in FIG. 8 and a reflectance "$r_w$" of the sidewall of the protrusion 28. A shortest distance "d" between the center "O" and the missing portion 23 is given by equation (7). The shortest distance "d" is a length of a normal line to a line contour of the missing portion 23 connecting the center "O" and the line contour. A half length "e" of the line contour of the missing portion 23 is given by equation (8). The distance "d" and the length "e" are used to calculate the area of the missing portion 23.

$$d = \sin\beta = D^2/(D^2+h^2)^{1/2} \qquad (7)$$

$$e = (NA_p^2 - d^2)^{1/2} \qquad (8)$$

The projected image simulation engine 351, shown in FIG. 1, calculates a logical addition (OR) of the optical intensity $I_1(x, y)$ of the "first field 10", shown in FIG. 4, calculated by the first optical intensity calculator 310 and the optical intensity $I_2(x, y)$ of the "second field 20" calculated by the second optical intensity calculator 311. Further the projected image simulation engine 351 simulates the optical intensity distribution of the projected image of the mask pattern of the photomask 5, shown in FIG. 3, on the substrate 27.

With reference again to FIG. 1, an exposure data memory 320 is connected to the CPU 300. The exposure data memory 320 includes a projection optical system parameter memory module 302, a substrate shape memory module 303, a mask pattern memory module 304, a field memory module 201, an optical intensity memory module 202, and a projected image memory module 203. The projection optical system parameter memory module 302 is configured to store exposure conditions such as the numerical aperture "$NA_p$" and the coherency "σ" of the projection optical system 42 of the exposure tool, shown in FIG. 2, and illumination conditions such as annular and dipole illuminations of the light source 41. The substrate shape memory module 303, shown in FIG. 1, is configured to store the CAD data of the surface topology of the substrate 27, shown in FIG. 3, disposed on the wafer stage 32 of the exposure tool shown in FIG. 2. Also, the substrate shape memory-module 303, shown in FIG. 1, is configured to store the reflectance "$r_w$" of the protrusion 28.

The mask pattern memory module 304 is configured to store CAD data of design data of the mask pattern of the photomask 5, shown in FIG. 3, disposed on the reticle stage 15 of the exposure tool shown in FIG. 2, for example. The field memory module 201, shown in FIG. 1, stores the CAD data of the surface topologies of the "first field 10" and the "second field 20", shown in FIG. 4, divided by the field divider 309. The optical intensity memory module 202, shown in FIG. 1, is configured to store the optical intensity $I_1(x, y)$ of the "first field 10", shown in FIG. 4, calculated by the first optical intensity calculator 310. Also, the optical intensity memory module 202, shown in FIG. 1, is configured to store the optical intensity $I_2(x, y)$ of the "second field 20", shown in FIG. 4, calculated by the second optical intensity calculator 311. The projected image memory module 203, shown in FIG. 1, is configured to store the optical intensity distribution of the projected image on the substrate 27 of the mask pattern of the photomask 5, shown in FIG. 3, simulated by the projected image simulation engine 351.

An input unit 312, an output unit 313, a program memory 330, and a temporary memory 331 are further connected to the CPU 300. A keyboard and a mouse may be used as the input unit 312. A printer and display devices such as a liquid crystal display (LCD) and a cathode ray tube (CRT) display can be used as the output unit 313, for example. The program memory 330 stores an operating program instructing the CPU 300 to transfer data with apparatuses connected to the CPU 300. The temporary memory 331 stores temporary data calculated during operation by the CPU 300. Computer readable mediums such as semiconductor memories, magnetic memories, optical discs, and magneto optical discs can be used as the program memory 330 and the temporary memory 331, for example.

Figure 9:
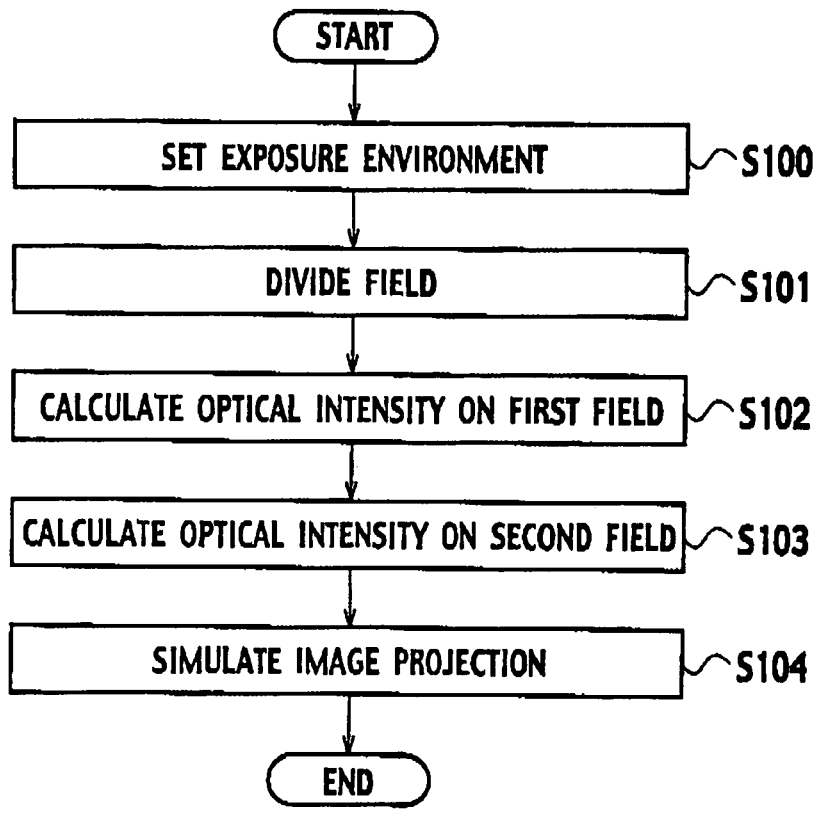
FIG. 9 is a flowchart depicting a computer implemented method for simulating an optical intensity distribution in accordance with the first embodiment of the present invention.

With reference next to FIG. 9, a computer implemented method for simulating the optical intensity distribution according to the first embodiment is described.

In step S100, the field divider 309, shown in FIG. 1, fetches the CAD data of the surface topology of the substrate 27, shown in FIG. 3, to be disposed on the wafer stage 72 of the exposure tool, shown in FIG. 2, from the substrate shape memory module 303. Then, the field divider 309, shown in FIG. 1, fetches the numerical aperture "$NA_p$" of the projection optical system 42 in the exposure tool, shown in FIG. 2, from the projection optical system parameter memory module 302.

In step S101, the field divider 309, shown in FIG. 1, calculates the angle "α" that is half of the angular aperture "2α" determined by the numerical aperture "$NA_p$" shown in FIG. 3. Also, the field divider 309 calculates the distance "$D_{max}$", shown in FIG. 4, based on the height "h" of the protrusion 28 on the substrate 27. The distance "$D_{max}$" is given by the equation (1). Then, the field divider 309, shown in FIG. 1, divides the surface of the substrate 27 into the "first field 10" and the "second field 20". The "first field 10" is the distance "$D_{max}$" away from the protrusion 28. The "first field 10" is directly exposed to the direct incident light component "$\phi_i$" incident at the maximum incident angle "α". The "second field 20" extends for the distance "$D_{max}$" from the edge of the protrusion 28. The "second field 20" is not directly exposed to the direct incident light component "$\phi_i$" incident at the maximum incident angle "α". The field divider 309 stores data of field topologies of the first and second fields 10, 20 in the field memory module 201.

In step S102, the first optical intensity calculator 310, shown in FIG. 1, fetches the data of the field topology of the "first field 10" from the field memory module 201. Then, the first optical intensity calculator 310 fetches the mask pattern of the photomask 5 disposed on the reticle stage 15 of the exposure tool, shown in FIG. 2, from the mask pattern memory module 304. Also, the first optical intensity calculator 310, shown in FIG. 1, fetches the exposure conditions such as the coherency "σ" of the optical system of the exposure tool, shown in FIG. 2, and the illumination conditions such as the annular and dipole illumination of the light source 41 from the projection optical system parameter memory module 302 shown in FIG. 1. Thereafter, the first optical intensity calculator 310 calculates the optical intensity $I_1(x, y)$ of the "first field 10" directly exposed to the direct incident light component by using the equation (2)-(5).

In step S103, the second optical intensity calculator 311 fetches the reflectance "$r_w$" of the sidewall of the protrusion 28, shown in FIG. 3, from the substrate shape memory module 303. Then, the second optical intensity calculator 311 fetches the mask pattern of the photomask 5 disposed on the reticle stage 15 of the exposure tool, shown in FIG. 2, from the mask pattern memory module 304. Also, the second optical intensity calculator 311, shown in FIG. 1, fetches the exposure conditions such as the coherency "σ" of the optical system of the exposure tool, shown in FIG. 2, and the illumination conditions such as the annular and dipole illumination of the light source 41 from the projection optical system parameter memory module 302 shown in FIG. 1. Thereafter, the second optical intensity calculator 311, shown in FIG. 1, fetches the data of the field topology of the "second field 20" from the field memory module 201. Further, the second optical intensity calculator 311 assumes that the contribution portion 223, shown in FIG. 8, is seen on the place of the missing portion 23 from the objective image point "Fs" on the "second field 20" shown in FIG. 7. Then, the second optical intensity calculator 311 calculates the optical intensity $I_2(x, y)$ of the objective image point "Fs". The second optical intensity calculator 311 calculates the optical intensity $I_2(x, y)$ at all coordinates on the "second field 20". Thereafter, the second optical intensity calculator 311 stores the optical intensity $I_2(x, y)$ in the optical intensity memory module 202.

In step S104, the projected image simulation engine 351 fetches the optical intensity $I_1(x, y)$ of the "first field 10" and the optical intensity $I_2(x, y)$ of the "second field 20" from the optical intensity memory module 202. Then, the projected image simulation engine 351 simulates the projected image of the mask pattern of the photomask, shown in FIG. 3, by calculating the logical addition (OR) of the optical intensity $I_1(x, y)$ of the "first field 10" and the optical intensity $I_2(x, y)$ of the "second field 20". Thereafter, the projected image simulation engine 351, shown in FIG. 1, stores the simulated projected image in the projected image memory module 203 and the computer implemented method for simulating the optical intensity distribution according to the first embodiment is completed.

As described above, the simulator of the optical intensity distribution, shown in FIG. 1, and the computer implemented method for simulating the optical intensity distribution, shown in FIG. 9, make it possible to simulate the optical intensity distribution on the substrate precisely even though the protrusion 28 is disposed on the substrate 27, as shown in FIG. 3. In an earlier method for simulating the optical intensity distribution, it is assumed that the all components of the light enter the surface of the substrate perpendicularly and the all components of the light are reflected from the surface of the substrate perpendicularly to simplify the calculation. If the protrusion on the substrate has a gentle slope, such earlier method may be efficacious. However, if the protrusion has a steep slope, such assumption that the all components of the light are reflected from the protrusion perpendicularly does not stand up. Therefore, a result of the earlier method for simulating the optical intensity distribution deviates from an actual result by the actual exposure tool.

Further, the simulator of the optical intensity distribution, shown in FIG. 1, and the computer implemented method for simulating the optical intensity distribution, shown in FIG. 9, do not use rigorous Maxwell equation to calculate the optical intensity around the protrusion 28 shown in FIG. 7. However, the system and the method, shown in FIGS. 1 and 9, make it possible to precisely calculate the optical intensity $I_2(x, y)$ of the "second field 20" shaded by the protrusion 28. Since the system and the method, shown in FIGS. 1 and 9, do not use rigorous Maxwell equation to calculate the optical intensity around the protrusion 28, it is possible to shorten time for the method for simulating the optical intensity distribution.

In the first embodiment, the single protrusion 28 is disposed on the substrate 28 shown in FIG. 3, as an example. However, the simulator of the optical intensity distribution, shown in FIG. 1, is still effective when a plurality of protrusions are disposed on the substrate 27.

FIRST MODIFICATION OF THE FIRST EMBODIMENT

The first embodiment describes the case where the lengthwise directions of the plurality of light shield patterns 100a, 100b, 100c, shown in FIG. 3, and the lengthwise direction of the protrusion 28 are parallel. Here, the first modification of the first embodiment describes the case where each lengthwise direction of the plurality of light shield patterns 100a, 100b, 100c is perpendicular to the lengthwise direction of the protrusion 28, as shown in FIG. 10.

Figure 10:
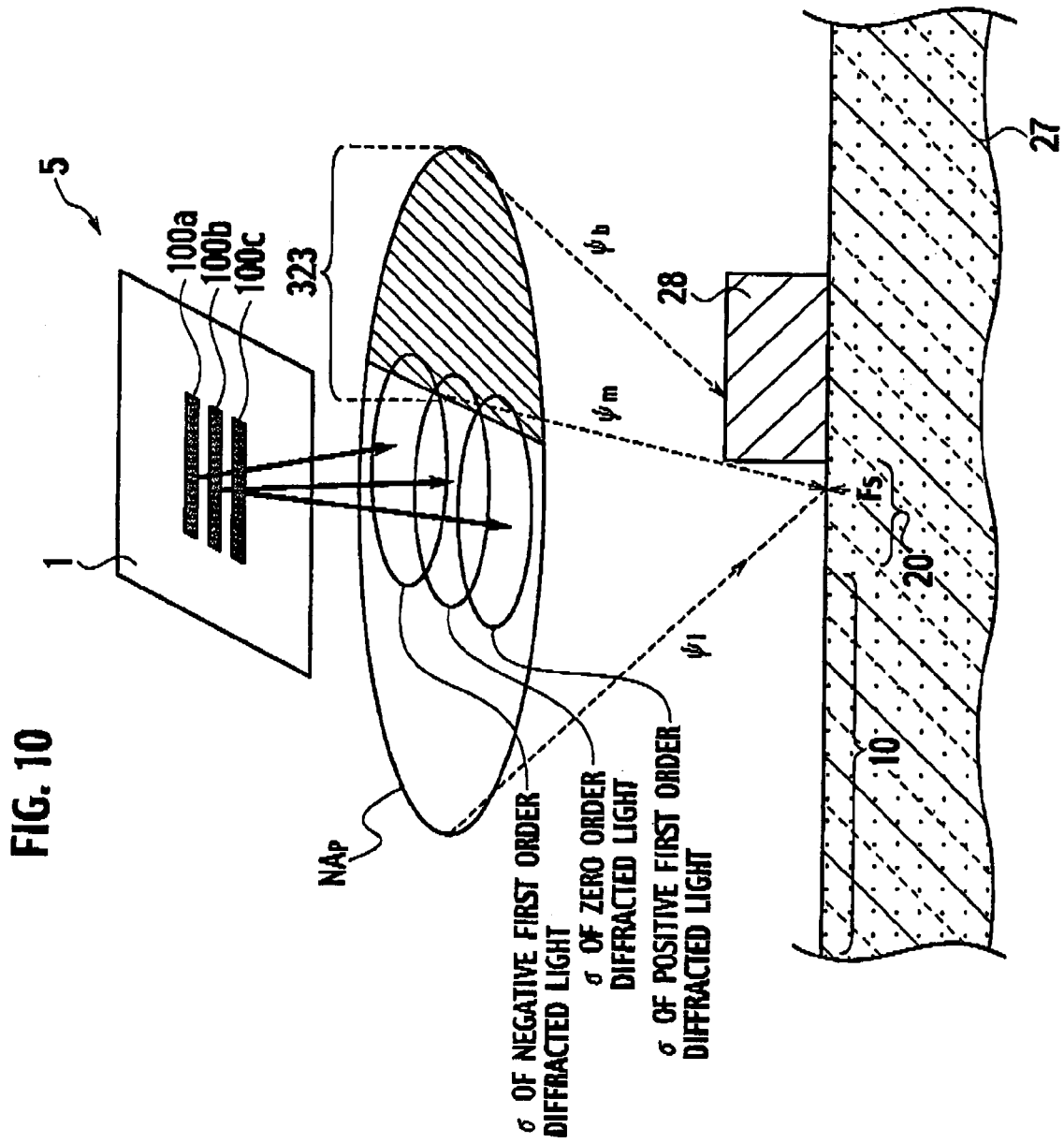
FIG. 10 illustrates the optical system of the exposure tool in accordance with a first modification of the first embodiment of the present invention.

The exit pupil of the projection optical system 42, shown in FIG. 2, seen from the objective image point "Fs" on the "second field 20" shaded by the protrusion 28 has the missing portion 323, as shown in FIG. 10. When each lengthwise direction of the plurality of light shield patterns 100a, 100b, 100c is perpendicular to the lengthwise direction of the protrusion 28, a zero order diffracted light, a positive first order diffracted light, and a negative order first diffracted light produced by the photomask 5 overlap the missing portion 323 equally. Therefore, each of the zero order diffracted light, the positive first order diffracted light, and the negative order first diffracted light passes through a portion of a plane of the pupil of the projection optical system 42 shown in FIG. 2. Since the positive first order diffracted light and the negative order first diffracted light overlap the missing portion 323 shown in FIG. 10 equally, the optical intensities of the positive first order diffracted light and the negative order first diffracted light are regarded as equal. Accordingly, the optical intensity of the zero order diffracted light passing through the plane of the pupil of the projection optical system 42 partially is took into account when the image formation on the "second field 20" is calculated. However, there is no need to take into account the change of the shape of the plane of the pupil of the projection optical system 42.

Figure 11:
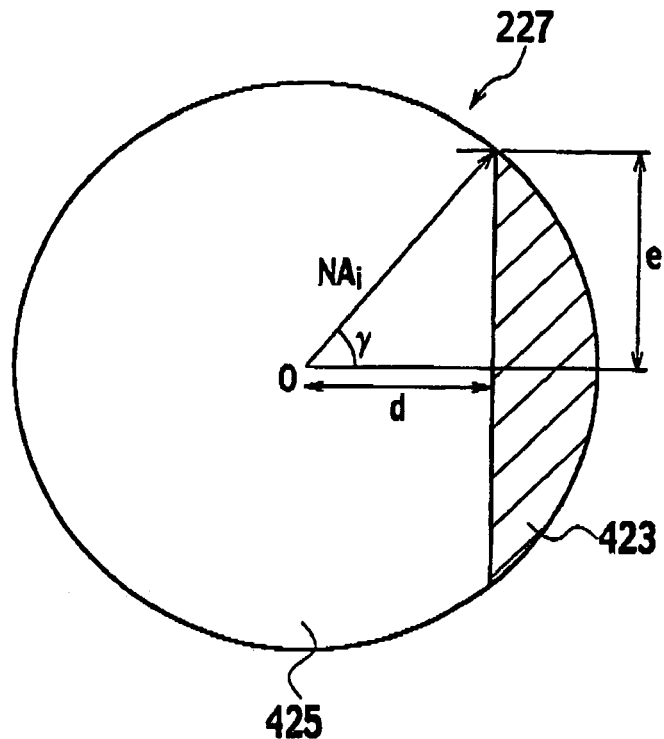
FIG. 11 is a first diagram of the exit pupil in accordance with the first modification of the first embodiment of the present invention.

The shape of the zero order diffracted light produced by the photomask 5 shows the shape of the illumination optical system 14 shown in FIG. 2. When it is assumed that the reflected light reflected from the sidewall of the protrusion 28, shown in FIG. 10, is negligible, the aperture 227 of the illumination optical system 14 having the numerical aperture "$NA_i$" seen from the objective image point "Fs" on the second field 20 has the missing portion 423, as shown in FIG. 11, by the protrusion 28. Therefore, the shape of the image 425 of the illumination optical system 14 is not circular.

Figure 12:
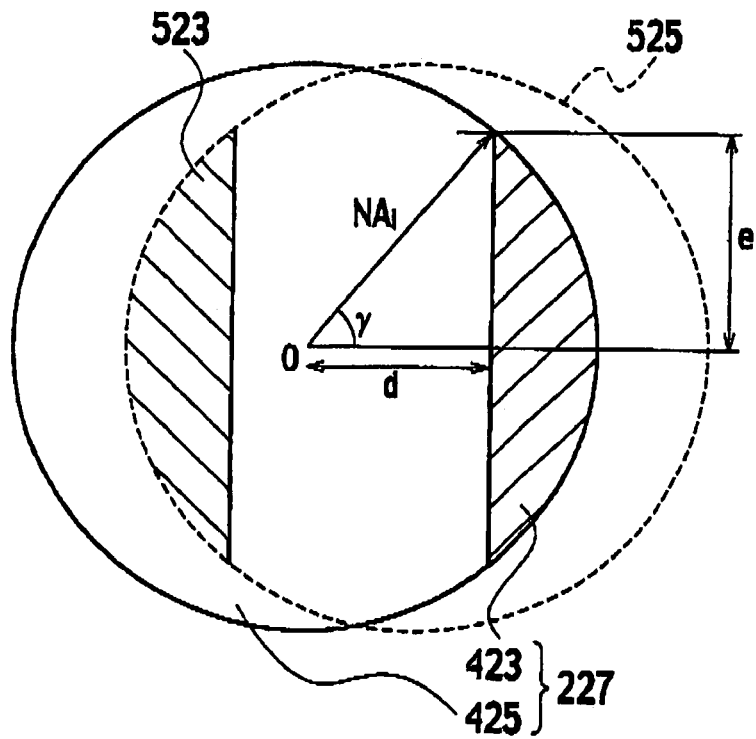
FIG. 12 is a second diagram of the exit pupil in accordance with the first modification of the first embodiment of the present invention.

However, when the reflected light reflected from the sidewall of the protrusion 28 is took into account, the light component "$\phi_i$" incident on the sidewall of the protrusion 28 at the incident angle that is more than "β" and less than "α" from the opposite side of the protrusion 28 is reflected from the point the distance "R" away from the upper side of the sidewall of the protrusion 2B and reaches the objective image point "Fs", as shown in FIG. 7. With reference to FIG. 12, the light component "$\phi_r$" reflected from the sidewall of the protrusion 2B comes from a contribution portion 523 of an image 525 of the illumination optical system 14 seen from the hypothetical image point "Fi" shown in FIG. 7. The missing portion 423 and the contribution portion 523 correspond to the light component incident on the surface of the substrate 27 at the incident angle that is more than "β" and less than "α". Therefore, the missing portion 423 and the contribution portion 523 are congruent. The light component "$\phi_b$" passing through the missing portion 423 of the aperture 227 of the illumination optical system 14 does not contribute to the image formation at the objective image point "Fs". However, the light component "$\phi_r$" passing through the contribution portion 523 symmetrical to the missing portion 423 does contribute to the image formation at the objective image point "Fs". Therefore, the contribution portion 523, shown in FIG. 12, is seen on the place of the missing portion 423 from the objective image point "Fs" shown in FIG. 7.

With reference to FIG. 11, the shortest distance "d" between the center "O" and the missing portion 423 is given by the equation (7). The shortest distance "d" is the length of the normal line to the line contour of the missing portion 423 connecting the center "O" and the line contour. The half length "e" of the line contour of the missing portion 423 is given by the equation (9). The distance "d" and the length "e" are used to calculate the area of the missing portion 423.

$$e = (NA_i^2 - d^2)^{1/2} \quad (9)$$

An angle "γ" that is a half angle of a center angle of an arc of the missing portion 423 is given by equation (10).

$$\gamma = \cos^{-1}(d/NA_i) \quad (10)$$

Therefore, an area "$A_s$" of the missing portion 423 that is congruent to the contribution 523 is given by equation (11) by using the length "d", the length "e", and the angle "γ" given by the equations (7), (9), and (10).

$$A_s = \pi * NA_i^2 * 2\gamma/(2\pi) - e*d \quad (11)$$

An area "$A_i$" of the aperture 227 of the illumination optical system 14 is given by equation (12).

$$A_i = \pi * NA_i^2 \quad (12)$$

Therefore, the optical intensity $I_2(x, y)$ at the objective image point "Fs" is given by equation (13).

$$A_s:A_s-A_i+r_w*A_i=I_0(x, y): I_2(x, y)\; I_2(x, y)=(A_s-A_i+r_w*A_i)/A_s*I_0(x, y) \quad (13)$$

Here, $I_0(x, y)$ is the optical intensity at the objective image point "Fs" when the protrusion 28 does not exist.

As described above, when each lengthwise direction of the plurality of light shield patterns 100a, 100b, 100c is perpendicular to the lengthwise direction of the protrusion 28, as shown in FIG. 10, the second optical intensity calculator 311, shown in FIG. 1, calculates the optical intensity $I_2(x, y)$ of the "second field 20" by using the equation (7), (9), and (13) in step S103 of FIG. 9.

Figure 13:
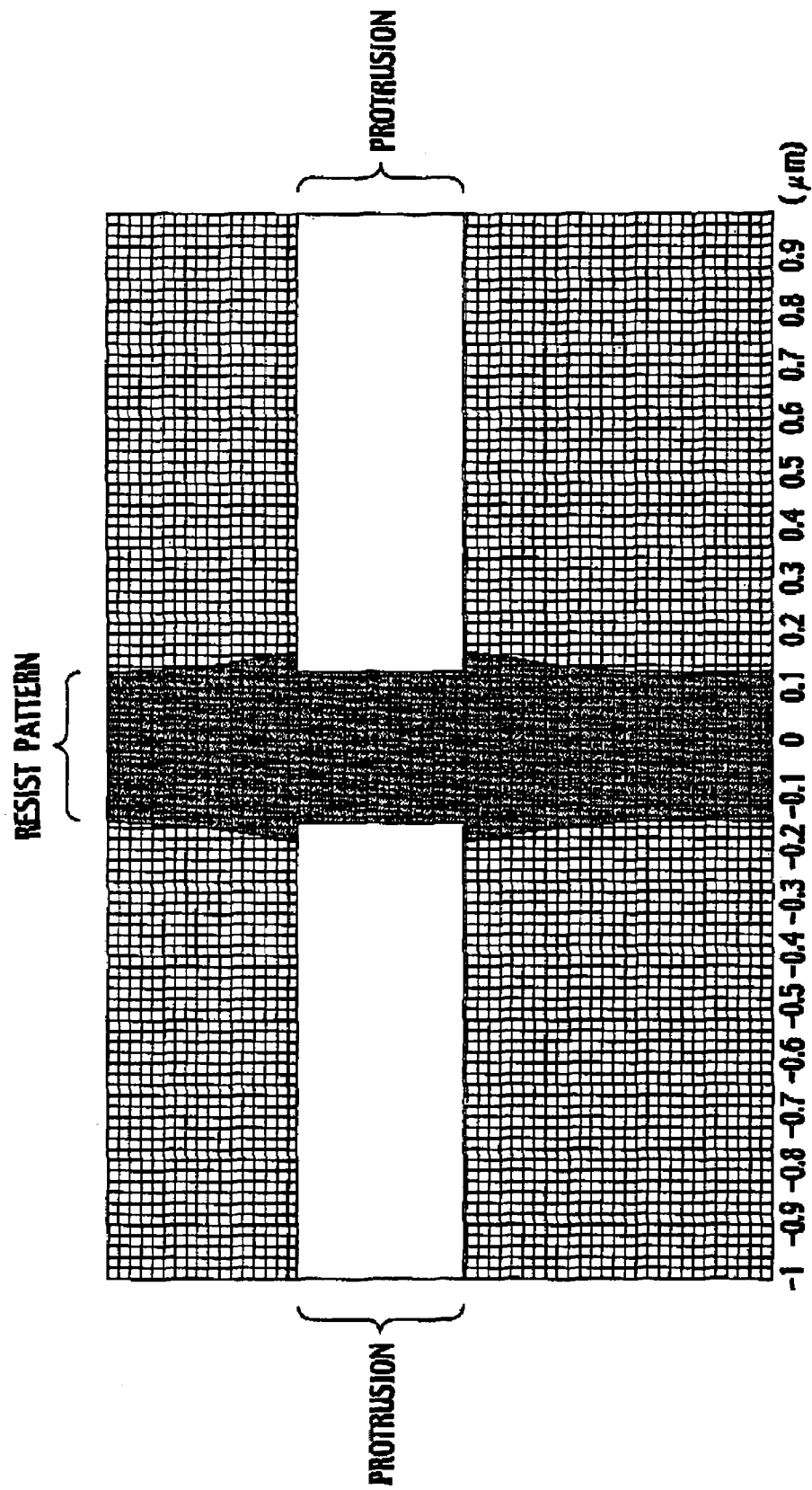
FIG. 13 shows a result of the computer implemented method for simulating the optical intensity distribution in accordance with the first modification of the first embodiment of the present invention.

FIG. 13 shows an example of the optical intensity distribution in a resist simulated by the computer implemented method according to the second modification of the first embodiment when the protrusion 28, shown in FIG. 10, has the height of 200 nanometers and the resist is coated on the substrate 27. The wavelength of the light is 248 nanometers. The numerical aperture "NA" is 0.6. The coherency "σ" is 0.75. The mask pattern having a width of 0.25 micrometers is projected on the surface of the resist. In FIG. 13, the resist pattern corresponds to a field of which the optical intensity is less than 0.35. A region surrounding the resist pattern corresponds to a field of which the optical intensity is more than 0.35. The resist is removed after the development on the field of which the optical intensity is more than 0.35. The simulated optical intensity distribution replicates an actual optical intensity distribution by the exposure tool precisely.

SECOND MODIFICATION OF THE FIRST EMBODIMENT

Figure 14:
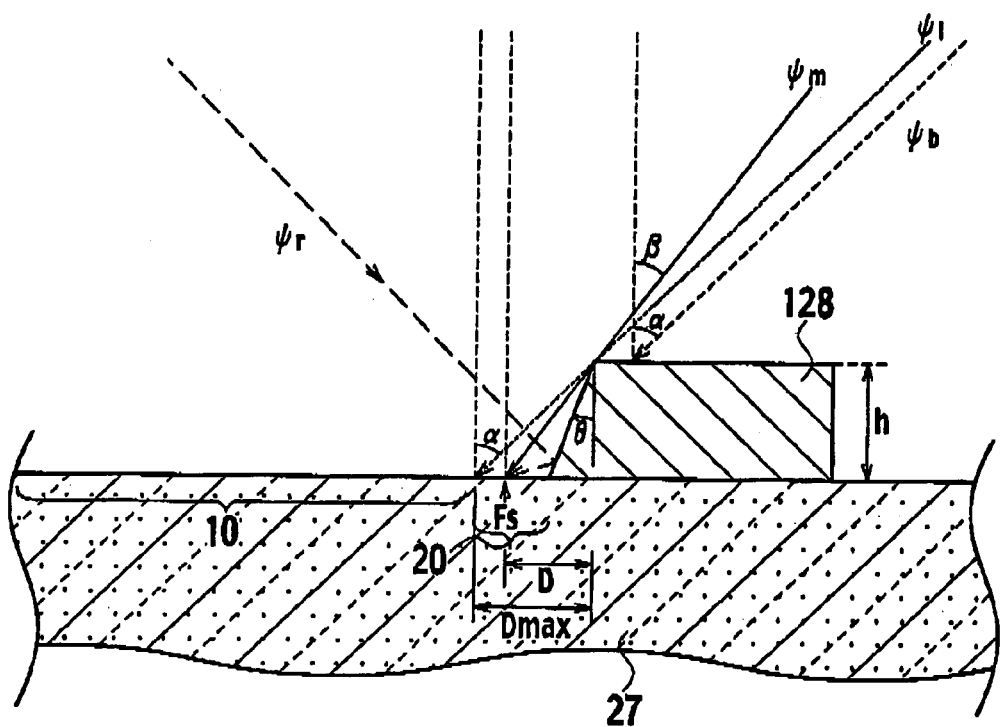
FIG. 14 is a diagram of the optical path of the light incident on the surface of the substrate in accordance with a second modification of the first embodiment of the present invention.

The first embodiment and the first modification describe the case where the sidewall of the protrusion 28 on the substrate 27 is vertical, as shown in FIGS. 3 and 10. However, the first embodiment of the invention is not limited to such cases. It is possible to apply the first embodiment to the case where the sidewall of the protrusion on the substrate 27 is not vertical but sloping. For example, it is possible to apply the first embodiment to the case where the sidewall of the protrusion 128 on the substrate 27 is sloping at a sloping angle "θ" to a normal to the surface of the substrate 27 as shown in FIG. 14. When the sloping angle "θ" is larger than the incident angle "α" of the projection optical system 42, the image point seeing the exit pupil having the missing portion does not exist on the substrate 27. Therefore, in this case, the "second field 20" does not exist on the substrate 27. However, when the sloping angle "θ" is smaller than the incident angle "α" of the projection optical system 42, the objective image point "Fs" seeing the exit pupil having the missing portion exists on the substrate 27. Therefore, in this case, the "second field 20" exists on the substrate 27. Accordingly, the second optical intensity calculator 311, shown in FIG. 1, defines the field, shown in FIG. 14, extending for the distance "$D_{max}$" from a position where the normal to the substrate 27 passing the upper side of the sloping sidewall intersects with the substrate 27 as the "second field 20". Then, the second optical intensity calculator 311 calculates the optical intensity $I_2(x, y)$ of the "second field 20" in step S103 of FIG. 9.

As described above even though the sidewall of the protrusion 128 disposed on the substrate 27 is sloping at the sloping angle "θ", as shown in FIG. 14, the simulator of the optical intensity distribution, shown in FIG. 1, makes it possible to simulate the optical intensity distribution precisely at a high speed.

THIRD MODIFICATION OF THE FIRST EMBODIMENT

Figure 15:
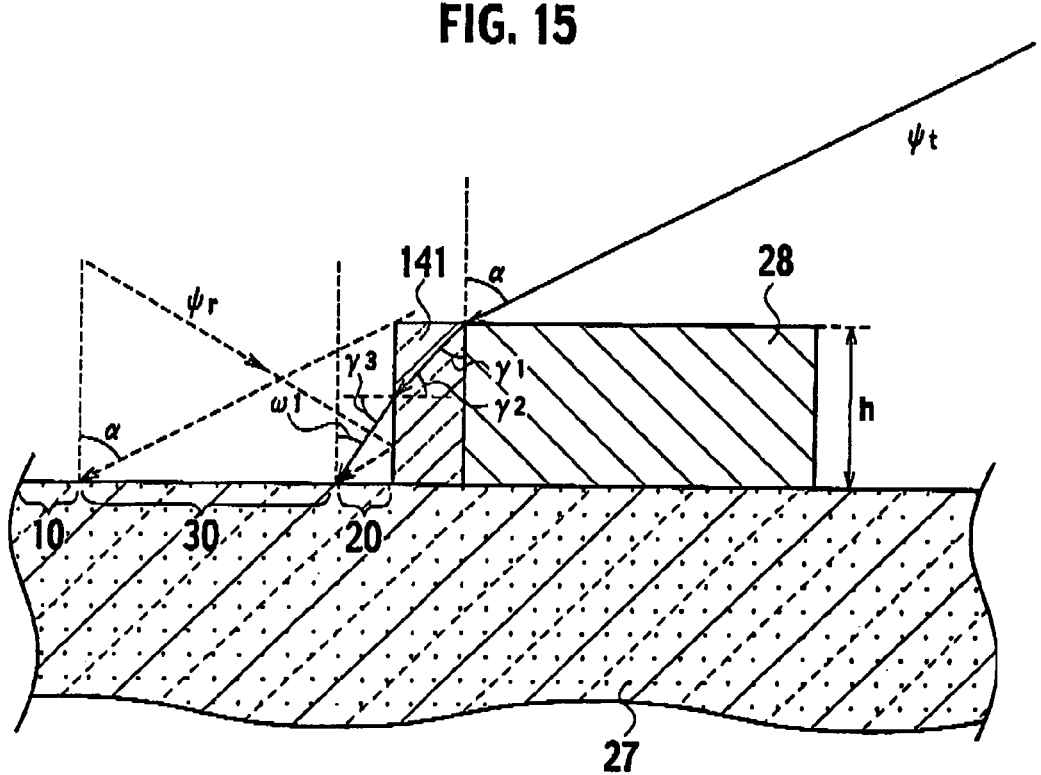
FIG. 15 is a diagram of the optical path of the light incident on the surface of the substrate in accordance with a third modification of the first embodiment of the present invention.

With reference to FIG. 15, it is possible to apply the computer implemented method for simulating the optical intensity distribution, according to the first embodiment, to the case where a transparent portion 141 adjoining the protrusion 28 is disposed on the substrate 27. The transparent portion 141 has the height "h" similar to the protrusion 28. The transparent portion 141 has refractive index "$n_1$". The light component "$\phi_i$" incident on the transparent 141 at the incident angle "α" penetrates the transparent portion 141 at a refraction angle "$\gamma_1$". Further, the light component "$\phi_i$" incident on a sidewall of the transparent 141 at the incident angle "$\gamma_2$" penetrates the exterior at a refraction angle "$\gamma_3$". Then, the light component "$\phi_t$" reaches the surface of the substrate 27 at an incident angle "$\omega_1$". According to Snell's law, the angles "α", "$\gamma_1$", "$\gamma_2$", "$\gamma_3$", and "$\omega_1$" are given by equations (14) and (15).

$$\sin\alpha/\sin\gamma_1 = \sin\gamma_3/\sin\gamma_2 = n_1 \quad (14)$$

$$\gamma_1 + \gamma_2 = \gamma_3 + \omega_1 = \pi/2 \quad (15)$$

When the transparent portion 141 is disposed on the substrate 27, the field divider 309, shown in FIG. 1, divides the exposure field on the substrate 27 into the "first field 10", the "second field 20", and a "middle field 30", as shown in FIG. 15. The "first field 10" is exposed to the light component "$\phi_i$" incident at the maximum incident angle "α". The "second field 20" is not exposed to the light component "$\phi_i$" incident at the maximum incident angle "α", since the light component "$\phi_i$" is blocked by the protrusion 28. The "middle field 30" is exposed to the light component "$\phi_t$" passing through the transparent portion 141. An optical intensity of the "middle field 30" is calculated by using a transmittance of the transparent portion 141.

SECOND EMBODIMENT

Figure 16:
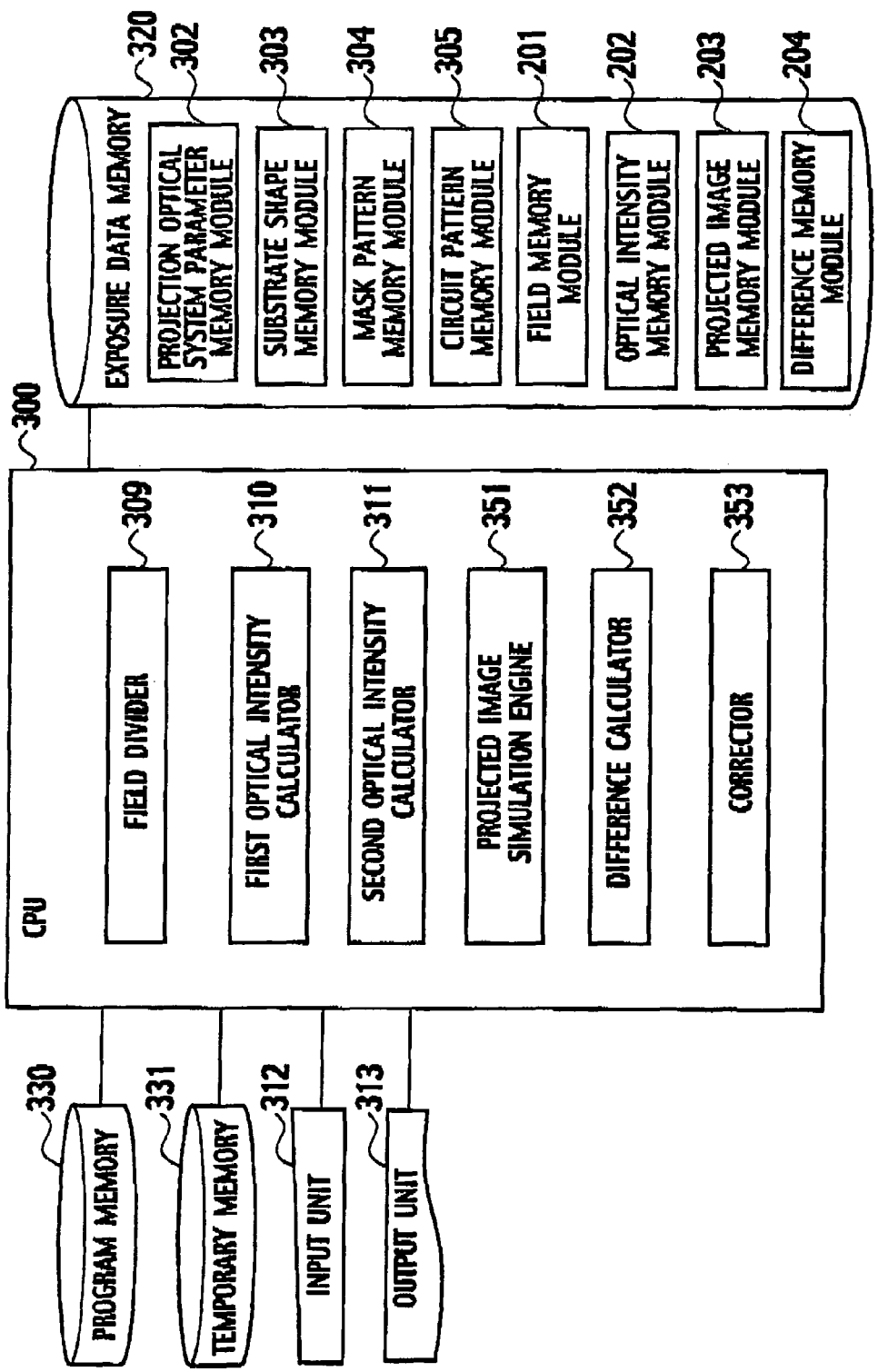
FIG. 16 s a diagram of a system for correcting a mask pattern in accordance with a second embodiment of the present invention.

With reference to FIG. 16, a system for correcting the mask pattern, according to the second embodiment, includes a difference calculator 352 and a corrector 353. The difference calculator 352 is configured to calculate a difference between the projected image simulated by the projected image simulation engine 351 and a design pattern of a circuit pattern manufactured by the mask pattern. The corrector 353 is configured to correct the design data of the mask pattern, such as a line width of the mask pattern, to reduce the difference calculated by the difference calculator 352.

Also, the exposure data memory 320 includes a circuit pattern memory module 305 and a difference memory module 204. The circuit pattern memory module 305 is configured to store the design pattern of the circuit pattern by using the CAD data, for example. The difference memory module 204 is configured to store the difference calculated by the difference calculator 352. Other components of the system for correcting the mask pattern are similar to the simulator of the optical intensity distribution shown in FIG. 1.

Figure 17:
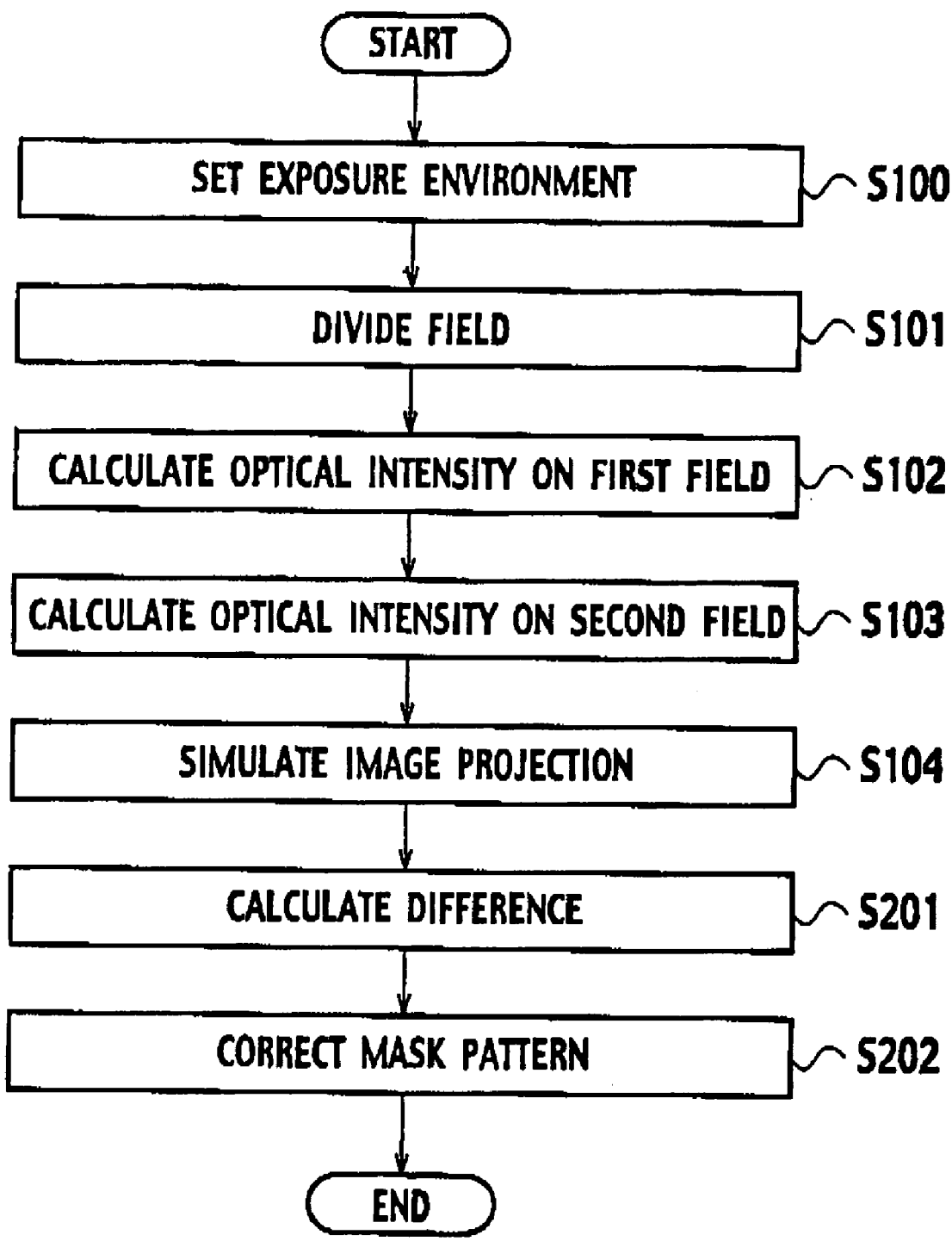
FIG. 17 is a flowchart depicting a method for correcting the mask pattern in accordance with the second embodiment of the present invention.

With reference to FIG. 17, a method for correcting the mask pattern according to the second embodiment is described.

Step S100 to step S104 are carried out similar to the method for simulating the optical intensity distribution shown in FIG. 9. In step S201 of FIG. 17, the difference calculator 352, shown in FIG. 16, fetches the design pattern of the circuit pattern from the circuit pattern memory module 305. Then, the difference calculator 352 calculates the difference between the projected image stored in the projected image memory module 203 and the design pattern of the circuit pattern. The difference calculator 352 stores the difference in the difference memory module 204. In step S202, the corrector 353 corrects the design data of the mask pattern, such as the line width of the mask pattern, to reduce the difference stored in the difference memory module 204. The corrector 353 stores the corrected mask pattern in the mask pattern memory module 304.

When the protrusion 28 is disposed on the substrate 27, as shown in FIG. 3, the projected image of the mask pattern may deviates from the design pattern of the circuit pattern. However, the system for correcting the mask pattern, shown in FIG. 16, and the method for correcting the mask pattern, shown in FIG. 17, make it possible to make the projected image the same as the design pattern by correcting the mask pattern.

OTHER EMBODIMENTS

Although the invention has been described above by reference to the embodiment of the present invention, the present invention is not limited to the embodiment described above. Modifications and variations of the embodiment described above will occur to those skilled in the art, in the light of the above teachings.

Figure 18:
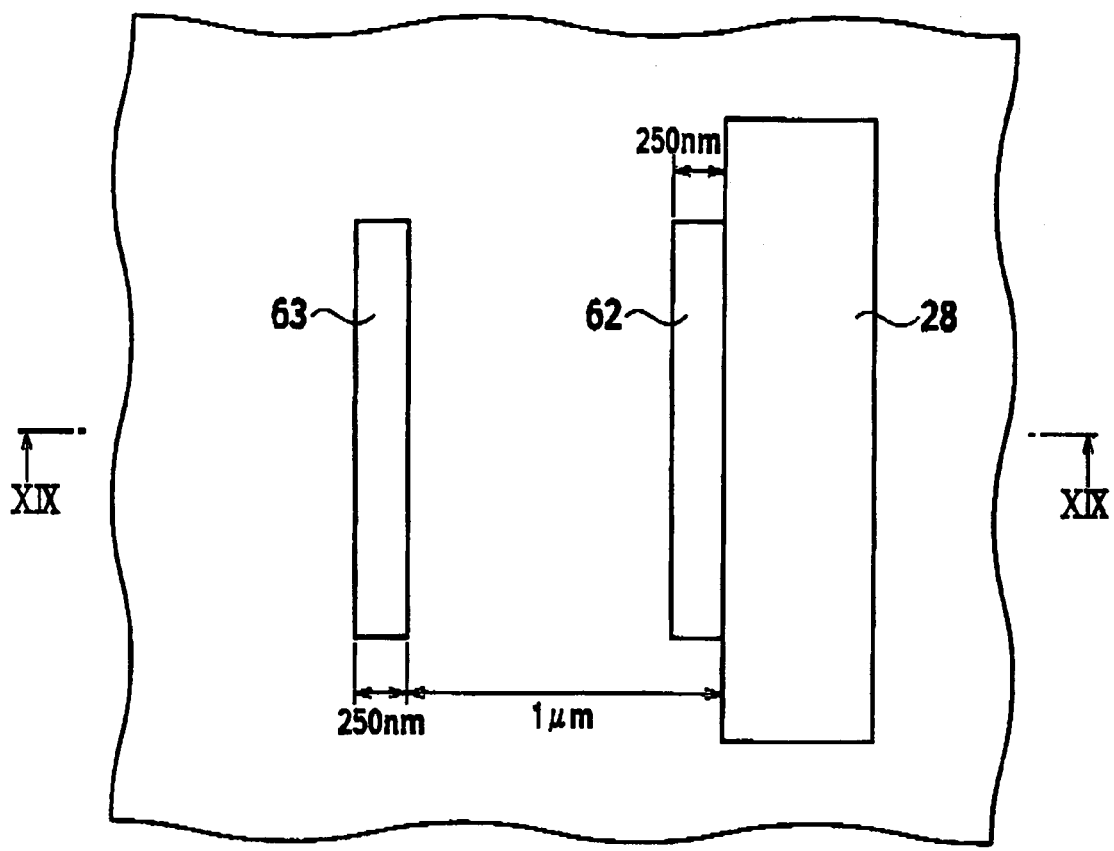
FIG. 18 is a plan view of the substrate in accordance with other embodiment of the present invention.
Figure 19:
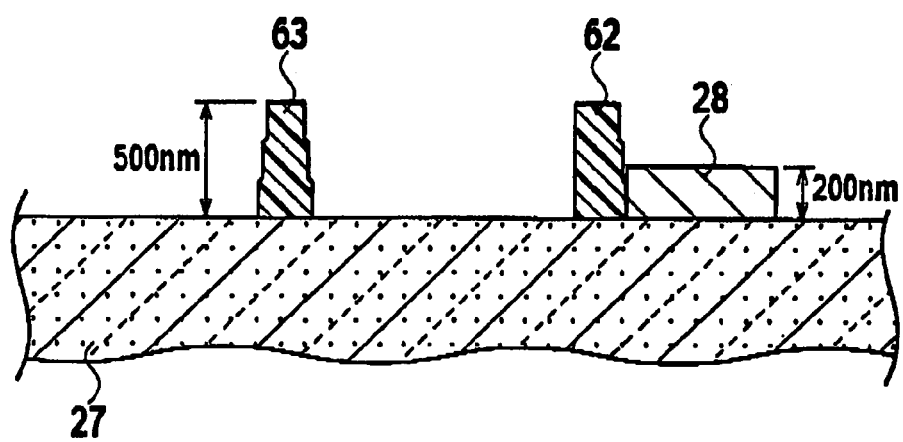
FIG. 19 is a cross sectional view of the substrate in accordance with other embodiment of the present invention.

For example, a combination of the computer implemented method for simulating the optical intensity distribution and a development simulation makes it possible to simulate the shape of the developed resist pattern. With reference to FIGS. 18 and 19, the protrusion 28 having a height of 200 nanometers is disposed on the substrate 27. A resist pattern 62 adjoining the protrusion 28 is formed. A resist pattern 63 is formed one micrometer away from the protrusion 28. Each width of bottom sides of the resist patterns 62, 63 is 250 nanometers. Each of the resist patterns 62, 63 has a height of 500 nanometers. When the simulation for simulating the optical intensity distribution is executed by using Krypton Fluoride (KrF) laser, the numerical aperture (NA) of 0.6, and the coherency "σ" of 0.75 and the development simulation is further executed, the resist pattern 63 having a symmetrical shape and the resist pattern 64 having an asymmetrical shape is predicted, as shown in FIG. 19. A degree of the overlap with the missing portion 23 is different among the negative first order diffracted light, the zero order diffracted light, and the positive first order diffracted light, as shown in FIG. 3. Therefore, the resist patterns 63, 64, shown in FIG. 19, have the different shape.

Also, it is possible to apply the computer implemented method for simulating the optical intensity distribution, according to the embodiments, to a case where the light is polarized. In this case, the optical intensity $I_2(x, y)$ of the "second field 20" is calculated, based on the phenomenon that the reflectance of the sidewall of the protrusion is different, depending on a polarization direction.

Also, in the method for correcting the mask pattern shown in FIG. 17, the size, such as the line width, of the mask pattern is corrected to reduce the difference between the projected image and the design pattern of the circuit pattern. However, correcting the height "h" of the protrusion 28, shown in FIG. 3, to reduce the difference between the projected image and the design pattern of the circuit pattern is an alternative to make the projected image the same as the design pattern. Correcting the shape of the protrusion 28 to reduce the difference is also an alternative.

The computer implemented method for simulating the optical intensity distribution according to the embodiment of the present invention is capable of being expressed as descriptions of a series of processing or commands for the simulator. Therefore, the computer implemented method for simulating the optical intensity distribution, shown in FIG. 9, is capable of being formed as a computer program product to execute multiple functions of the CPU 300 shown in FIG. 1. "The computer program product" includes, for example, various writable mediums and storage devices incorporated or connected to the simulator. The writable mediums include a memory device, a magnetic disc, an optical disc and any devices that record computer programs.

As described above, the present invention includes many variations of embodiments. Therefore, the scope of the invention is defined with reference to the following claims.

What is claimed is:

1. A simulator of an optical intensity distribution comprising:

a field divider configured to divide an exposure field on a substrate into a first field and a second field, the first field being directly exposed to a light incident at the maximum incident angle, the maximum incident angle being determined by a numerical aperture of an optical projection system, the second field being prevented from being directly exposed to the light by a protrusion disposed on the substrate;

a first optical intensity calculator configured to calculate an optical intensity of the first field by using a direct incident light component of the light;

a second optical intensity calculator configured to calculate an optical intensity of the second field by using a reflected light component of the light reflected from a sidewall of the protrusion;

a projected image simulation engine configured to simulate an optical intensity distribution of a projected image of a mask pattern on the substrate, based on the optical intensities of the first field and the second field; and a projected image memory module configured to store the optical intensity distribution of the projected image.

2. The simulator of claim 1, wherein the second optical intensity calculator calculates an area of a missing portion of an exit pupil seen from an objective image point on the second field, the missing portion being caused by the protrusion.

3. The simulator of claim 2, wherein the second optical intensity calculator assumes that a hypothetical image point symmetric to the objective image point with respect to the sidewall exists.

4. The simulator of claim 3, wherein the second optical intensity calculator assumes that a contribution portion congruent to the missing portion is seen from the hypothetical image point.

5. The simulator of claim 4, wherein the second optical intensity calculator assumes that the contribution portion is seen on a place of the missing portion from the objective image point.

6. The simulator of claim 1, wherein the second optical intensity calculator calculates the optical intensity of the second field by using a reflectance of the sidewall.

7. The simulator of claim 1, wherein the projected image simulation engine calculates a logical addition of the optical intensities of the first and second fields.

8. A method for simulating an optical intensity distribution comprising:

dividing an exposure field on a substrate into a first field and a second field, the first field being to be directly exposed to a light incident at the maximum incident angle, the maximum incident angle being determined by a numerical aperture of an optical projection system, the second field being prevented from being directly exposed to the light by a protrusion disposed on the substrate;

calculating an optical intensity of the first field by using a direct incident light component of the light;

calculating an optical intensity of the second field by using a reflected light component of the light reflected from a sidewall of the protrusion;

simulating an optical intensity distribution of a projected image of a mask pattern on the substrate, based on the optical intensities of the first field and the second field; and storing the optical intensity distribution of the projected image in a projected image memory module.

9. The method of claim 8, wherein calculating the optical intensity of the second field comprises calculating an area of a missing portion of an exit pupil seen from an objective image point on the second field, the missing portion being caused by the protrusion.

10. The method of claim 9, wherein calculating the optical intensity of the second field comprises assuming that a hypothetical image point symmetric to the objective image point with respect to the sidewall exists.

11. The method of claim 10, wherein calculating the optical intensity of the second field comprises assuming that a contribution portion congruent to the missing portion is seen from the hypothetical image point.

12. The method of claim 11, wherein calculating the optical intensity of the second field comprises assuming that the contribution portion is seen on a place of the missing portion from the objective image point.

13. The method of claim 8, wherein calculating the optical intensity of the second field comprises calculating the optical intensity of the second field by using a reflectance of the sidewall.

14. The method of claim 8, wherein simulating the optical intensity distribution comprises calculating a logical addition of the optical intensities of the first and second fields.

15. A method for correcting a mask pattern comprising:

dividing an exposure field on a substrate into a first field and a second field, the first field being directly exposed to a light incident at the maximum incident angle, the maximum incident angle being determined by a numerical aperture of an optical projection system, the second field being prevented from being directly exposed to the light by a protrusion disposed on the substrate;

calculating an optical intensity of the first field by using a direct incident light component of the light;

calculating an optical intensity of the second field by using a reflected light component of the light reflected from a sidewall of the protrusion;

simulating an optical intensity distribution of a projected image of a mask pattern on the substrate, based on the optical intensities of the first field and the second field;

calculating a difference between the projected image and a design pattern of a circuit pattern manufactured by using the mask pattern;

correcting design data of the mask pattern to reduce the difference; and storing the corrected design data of the mask pattern in a mask pattern memory module.

16. The method of claim 15, wherein calculating the optical intensity of the second field comprises calculating an area of a missing portion of an exit pupil seen from an objective image point on the second field, the missing portion being caused by the protrusion.

17. The method of claim 16, wherein calculating the optical intensity of the second field comprises assuming that a hypothetical image point symmetric to the objective image point with respect to the sidewall exists.

18. The method of claim 17, wherein calculating the optical intensity of the second field comprises assuming that a contribution portion of an exit pupil seen from the hypothetical image point is seen on a place of the missing portion from the objective image point, the contribution portion and the missing portion being congruent.

19. The method of claim 15, wherein calculating the optical intensity of the second field comprises calculating the optical intensity of the second field by using a reflectance of the sidewall.

20. A computer medium for storing a computer program for a simulator, the computer program comprising:

instructions configured to divide an exposure field on a substrate into a first field and a second field, the first field being directly exposed to a light incident at the maximum incident angle, the maximum incident angle being determined by a numerical aperture of an optical projection system, the second field being prevented from being directly exposed to the light by a protrusion disposed on the substrate;

instructions configured to calculate an optical intensity of the first field by using a direct incident light component of the light;

instructions configured to calculate an optical intensity of the second field by using a reflected light component of the light reflected from a sidewall of the protrusion; and instructions configured to simulate an optical intensity distribution of a projected image of a mask pattern on the substrate, based on the optical intensities of the first field and the second field.

* * * * *